(12) United States Patent
Blocker et al.

(10) Patent No.: US 8,018,859 B2
(45) Date of Patent: Sep. 13, 2011

(54) METHOD AND APPARATUS FOR ASYNCHRONOUS ALARM CORRELATION

(75) Inventors: Aaron Blocker, Creedmoor, NC (US);
Chin-Wang Chao, Lincroft, NJ (US);
Wenwen Ji, Cedar Knolls, NJ (US);
Herman Lee, Morganville, NJ (US);
John Lee, Bartlett, IL (US); Sheauling Tang, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 155 days.

(21) Appl. No.: 12/343,056

(22) Filed: Dec. 23, 2008

(65) Prior Publication Data

US 2010/0157812 A1 Jun. 24, 2010

(51) Int. Cl.
*H04L 1/00* (2006.01)

(52) U.S. Cl. ............. 370/242; 370/252; 379/2; 709/224
(58) Field of Classification Search ........................ 379/2
See application file for complete search history.

(56) References Cited

U.S. PATENT DOCUMENTS

| | | | | |
|---|---|---|---|---|
| 6,052,722 | A * | 4/2000 | Taghadoss | 709/223 |
| 6,748,432 | B1 * | 6/2004 | Du et al. | 709/224 |
| 7,176,792 | B2 * | 2/2007 | Pereira et al. | 340/506 |
| 2006/0015603 | A1 * | 1/2006 | Jakobson et al. | 709/223 |
| 2006/0233310 | A1 * | 10/2006 | Adams et al. | 379/2 |
| 2008/0209517 | A1 * | 8/2008 | Nightingale et al. | 726/3 |

* cited by examiner

*Primary Examiner* — Chi H. Pham
*Assistant Examiner* — Shick Hom (57) ABSTRACT

A method and apparatus for providing asynchronous alarm correlation in packet networks are disclosed. For example, the method receives a trigger, and performs an asynchronous correlation of at least one root cause alarm with at least one symptom alarm.

10 Claims, 5 Drawing Sheets

METHOD AND APPARATUS FOR ASYNCHRONOUS ALARM CORRELATION

The present invention relates generally to communication networks and, more particularly, to a method and apparatus for asynchronous alarm correlation in telecommunication networks, e.g., Internet Protocol (IP) networks, or Frame Relay networks.

BACKGROUND OF THE INVENTION

When a network failure or degradation occurs, there may be a very large amount of alarms, e.g., thousands or tens of thousands of alarms and/or events, being generated by various network devices and/or monitoring systems. The alarms and/or events may be sent to one or more network monitoring applications. Unfortunately, many of the alarms and/or events may be related to a single root cause failure. However, correlating such large number of alarms and/or events to their root causes is computationally expensive and requires a significant amount of application development effort.

SUMMARY OF THE INVENTION

In one embodiment, the present invention discloses a method and apparatus for providing asynchronous alarm correlation in networks, e.g., packet networks. For example, the method receives a trigger, and performs an asynchronous correlation of at least one root cause alarm with at least one symptom alarm.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing asynchronous alarm correlation in telecommunication networks such as Internet Protocol (IP) networks. Although the present invention is discussed below in the context of IP networks, e.g., VoIP networks, the present invention is not so limited. Namely, the present invention can be applied for other telecommunication networks, e.g., cellular networks and the like.

Figure 1:
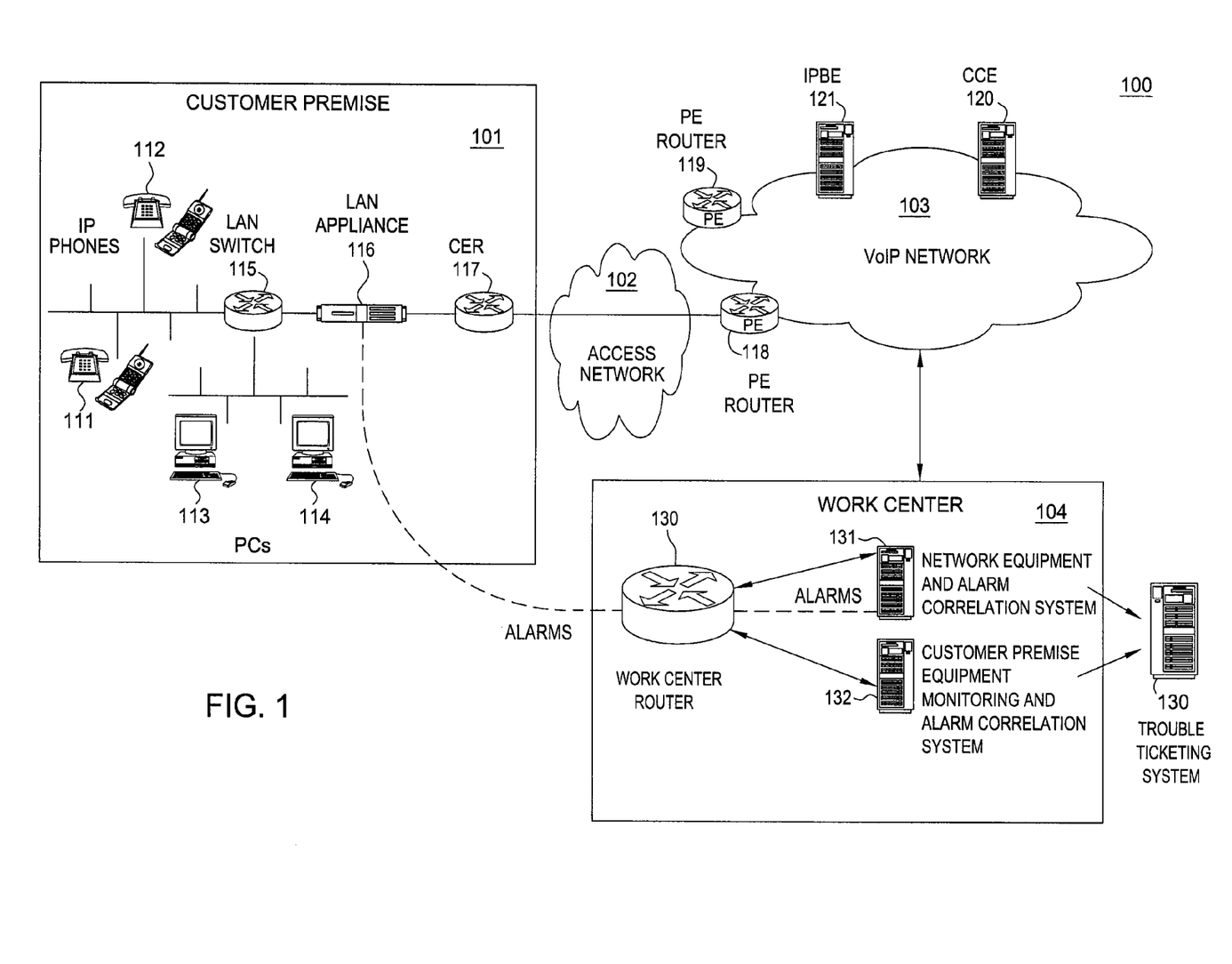
FIG. 1 illustrates an exemplary network related to the present invention.

To better understand the present invention, FIG. 1 illustrates an exemplary network 100, e.g., a VoIP network, related to the present invention. In one embodiment, the network 100 comprises various types of customer endpoint devices located at the customer premise 101 in communication with a service provider's core network, e.g., a VoIP network, 103 via an access network 102. A user at customer premise 101 may send and receive packets via customer endpoint devices 111-114.

In one embodiment, the customer endpoint devices are connected to a Local Area Network (LAN) switch 115. The LAN switch 115 is connected to a Local Area Network appliance device 116, e.g., an Ethernet probe, a traffic analyzer, or a traffic optimization device. The LAN appliance device 116 is connected to a Customer Edge Router (CER) 117 to access services in the VoIP network 103. The CER 117 accesses the VoIP network 103 via access network 102 and a Provider Edge Router (PER) 118, which is located in the VoIP network 103. The VoIP network 103 may also include other PE routers such as PER 119, Call Control Element (CCE) 120, Internet Protocol Border Element (IPBE) 121, and so on.

In one embodiment, the VoIP network 103 is in communications with a work center 104, e.g., a fault monitoring and management work center. The work center 104 contains a network equipment and alarm correlation system 131, a customer premise equipment monitoring and alarm correlation system 132, and a ticketing system 133. In one embodiment, the service provider may implement the current invention for asynchronous alarm correlation in an application server 130 located in the work center 104. The work center router 130 is able to route incoming alarms and/or events to the network equipment and alarm correlation system 131, the customer premise equipment monitoring and alarm correlation system 132. Any root cause alarms and/or events detected by alarm correlation systems 131 and 132 will be sent to the ticketing system 133 for generating or updating trouble tickets.

In one embodiment, the current invention for asynchronous alarm correlation first provides or defines an alarm correlation container object, one or more classes of alarm object, one or more object attributes, and one or more events. For example, the service provider may define an alarm correlation container object, three alarm object classes for performing correlation between root cause and symptom alarms, object attributes, and events as described below.

The correlation container can be a table, a file, or a database that stores the root cause alarms and the symptom alarms that need to be correlated before the CLS's of the alarms expire.

For example, the three classes of alarm object may comprise a root cause alarm object, a symptom alarm object, and an alarm matching rules object. A root cause alarm object may be used to define root cause alarms that may cause other symptom alarms. In the event of a device or network failure, a root cause alarm object may be used for automatic ticket generation and trouble resolution. A symptom alarm object, which is associated with the root cause alarm object, may be used to define alarms that may need to be suppressed. An alarm matching rules object may be used to define rule for matching one or more symptom alarms with one or more root cause alarms.

Each of the objects may have their own attributes, e.g., a Correlation Life Span (CLS). CLS refers to a predetermined length of time for correlating alarms to an object. The use of the CLS allows asynchronous correlation of the root cause alarm with symptom alarms. For example, if the CLS of a LAN appliance 116 failure alarm is set at one (1) minute and a LAN appliance failure alarm is received, then the method may correlate the received LAN appliance failure alarm to a root cause alarm, e.g., a CER 117 failure alarm, received up to 1 minute either preceding or following the network congestion alarm. That means, root cause alarms received up to one minute prior to the LAN appliance failure alarm as well as root cause alarms received up to one minute after the LAN appliance failure alarm may be correlated with the received LAN appliance failure alarm. Note that symptom alarms and root cause alarms may be received by a monitoring system at different times with random sequences and delays. Thus, having the CLS will allow the present invention to perform asynchronous correlation of the symptom alarms with the root cause alarms. The CLS may be defined for each object and may be fine tuned based on real-time behaviors of symptoms and root causes. For example, a real-time behavior may indicate LAN appliance failure alarms clear on their own within 15 seconds unless they are related to a node or fiber/cable failure.

In one embodiment, the correlation time window per "root cause alarm-symptom alarm" pair is defined as the sum of the CLS times of both alarm object types. For example, if a root cause alarm and a symptom alarm each has a CLS time of 2 minutes, then the correlation window is set to 4 minutes.

An event refers to a combination of alarm objects, a trigger and an action. The trigger causes an action to be performed on alarm objects. In one embodiment, the current invention provides two types of triggers: a new alarm trigger and an end of CLS trigger. A new alarm trigger occurs when a new alarm is received by an alarm correlation system. An end of CLS trigger occurs when an alarm object in the alarm correlation container reaches the end of its correlation life span (i.e., expires). The action refers to a process or a set of procedures to be applied to alarm objects, e.g., deleting the alarm from the correlation container, promoting a symptom alarm to a root cause alarm, etc.

The events may be triggered by arrival of new alarms and the CLS expiration of each alarm object in the correlation container. For example, when a root cause alarm or a symptom alarm is received, the method may record the arrival time of the alarm and the CLS expiration time of the alarm. For example, if a LAN appliance failure alarm (that may be defined as a symptom alarm) is received at 9:00 A.M. and the correlation life span is 2 minutes, then the method may record 9:02 A.M. as the CLS expiration time for the alarm. The LAN appliance failure alarm may then be correlated to root cause alarms between 8:58 A.M. and 9:02 A.M. The method may then perform correlations in the correlation container object by using the alarm matching rule objects to correlate the root cause alarm objects and the symptom alarm objects.

In one embodiment, the current invention provides five (5) events as illustrated below in Table 1. For example, Event 1 occurs when a new root cause alarm is received. The method processes the root cause alarm to create a ticket and to remove symptom alarms from the correlation container that are related to the root cause alarm.

Event 2 occurs when a CLS for a root cause alarm expires (e.g., end of correlation life span). The method then removes the root cause alarm from the correlation container.

Event 3 occurs when a new symptom alarm is received. The method processes the symptom alarm, e.g., performs correlation with root cause alarms in the correlation container. If a match is found, then the method suppresses the symptom alarm. If a match is not found, then the method inserts the symptom alarm in the correlation container.

Event 4 occurs when the CLS expires for a symptom alarm. The method then promotes the symptom alarm to a root cause alarm and creates a ticket for the newly promoted root cause alarm. That is, the current method automatically promotes a symptom alarm to a root cause alarm if no matching root cause alarm is identified prior to the expiration of the CLS time. For example, the CLS time may expire without receiving a root cause alarm that may be related to a symptom alarm.

The method then promotes the symptom alarm to a root cause alarm and creates a trouble ticket based on the alarm information.

Event 5 occurs when a "clear" command or instruction is received for a symptom alarm. Note that alarms that are related to the symptom alarm being cleared may be still held in the correlation container and not yet being sent to the ticketing application. Hence, it may be necessary to process the "clear" after all related "down" alarms are received by the ticketing application. In one embodiment, the current invention delays processing of the received clear alarm by the CLS time of the symptom alarm to prevent processing of the "clear" alarm before the corresponding "down" alarm is received by the ticketing application. The method then processes the "clear" alarm when the CLS delay expires.

It should be noted that the five (5) events as disclosed above are only illustrative. The present invention can be adapted to implement greater or lesser number of events depending on the specific requirements of a particular implementation. Furthermore, the action associated with each event can also be modified in accordance with the specific requirements of a particular implementation.

TABLE 1

| Event | Object | Trigger | Action |
|---|---|---|---|
| 1 | Root cause alarm | Arrival of a new root cause alarm | Process root cause alarm, e.g. create a ticket, Perform correlation to remove symptom alarms from correlation container that are related to the root cause alarm, etc. |
| 2 | Root cause alarm | End of CLS | Delete the root cause alarm from correlation container. |
| 3 | Symptom alarm | Arrival of a new symptom alarm | Process symptom alarm, e.g. perform correlation with root cause alarms in the correlation container. If there is a match, suppress the symptom alarm. If there is no match, insert the symptom alarm in the correlation container. |
| 4 | Symptom alarm | End of CLS | Promote the symptom alarm to a root cause alarm. Create a ticket for the newly promoted root cause alarm |
| 5 | Symptom alarm | Receive a clear for the symptom alarm | Delay processing of the received clear by the CLS time of the symptom alarm in order to prevent processing of the "clear" alarm before the corresponding "down" alarm is received by the ticketing application. When the CLS delay expires, process the "clear" alarm. |

The current method enables a service provider to reduce alarm volumes by first correlating symptom alarms with root cause alarms, thereby suppressing the symptom alarms. For example, the method may create a ticket for the root cause alarm and suppresses all related symptom alarms. Resolving the root cause alarm may then address all the symptom alarms simultaneously without having to generate a separate ticket for each symptom alarm. Thus, the present invention may significantly reduce the number of alarms and trouble tickets that must be processed.

It should be noted that the above method may be used for multiple network failure scenarios with different root cause to symptom alarm mappings. For example, one-to-many mappings may be defined between root cause alarms and symptom alarms.

Figure 2:
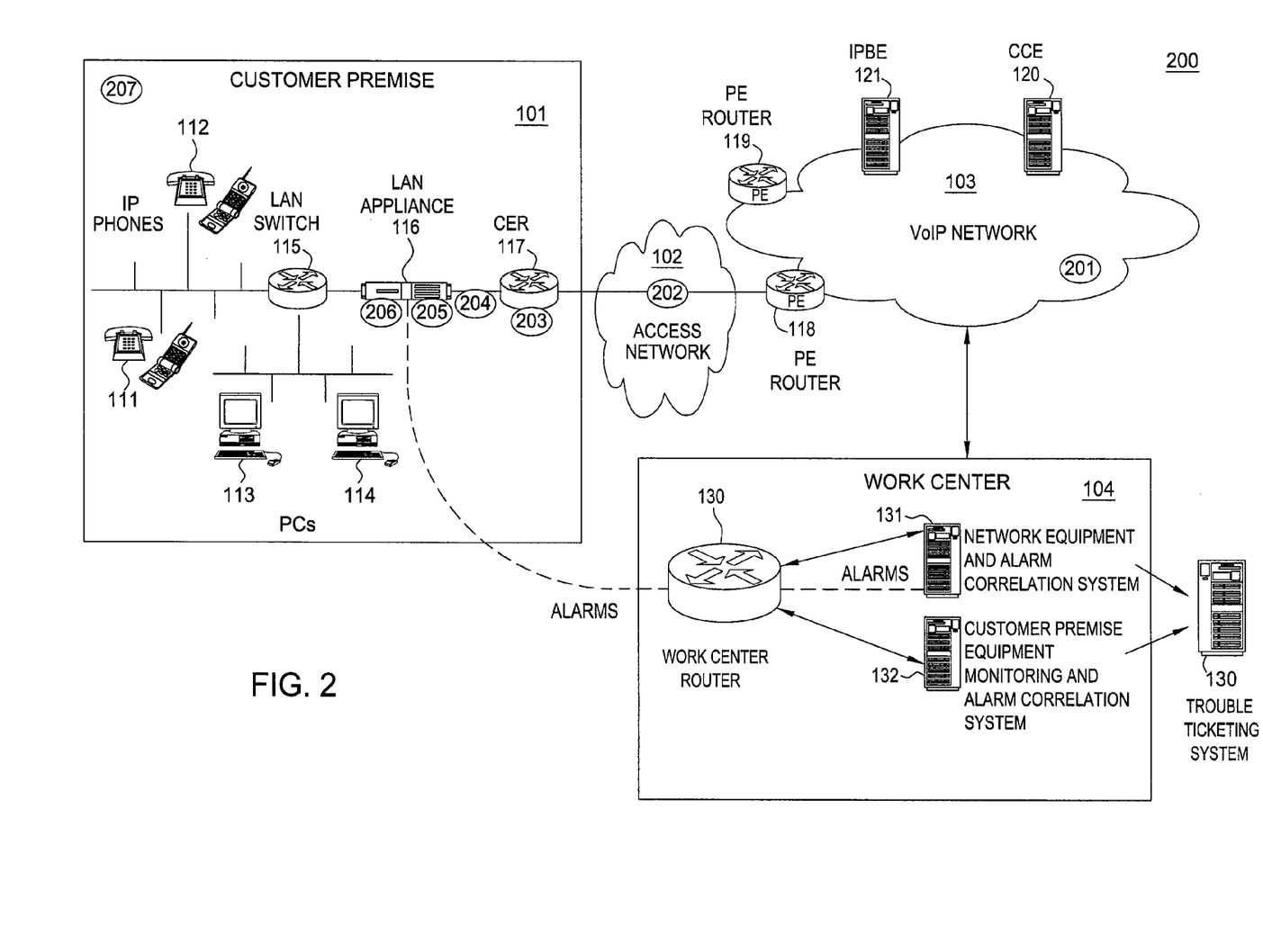
FIG. 2 illustrates an exemplary network for asynchronous alarm correlation.

FIG. 2 illustrates an exemplary fault scenario 200 for asynchronous alarm correlation. The service provider may provide a list of root cause alarms, symptom alarms, and alarm matching rules. The said alarm correlation method is applicable to all the defined symptom alarms, root cause alarms, and matching rules.

For example, a list of root cause alarms may be established based on various fault scenarios. In FIG. 2, a failure scenario 203, a root cause failure, may comprise a failure of the customer edge router 117. Failure scenario 204, a symptom failure, may comprise a failure of an Ethernet connection or interface between the LAN appliance device 116 and the customer edge router 117. Failure scenario 205, a symptom failure, may comprise a ping monitoring failure of the LAN appliance device 116.

Similarly, a list of symptom alarms mapping to a root cause failure may be established. For example, a ping failure alarm may be received from one or more devices such as the LAN appliance device as a result of the customer edge router (CER) 117 failure. In another example, the customer premises equipment monitoring and alarm correlation system 132 may be monitoring the LAN appliance device 116, and may detect a ping failure of the LAN appliance device and issue a symptom alarm of the ping failure.

The alarm matching rules for the example above may include comparing the IP addresses of root cause alarms and symptom alarms to determine whether or not they are related. For the example above, if a root cause alarm is received for the CER failure scenario 203, then a symptom alarm of a ping failure 205 may also be detected by the customer premises equipment monitoring and alarm correlation application or system 132 for the LAN appliance device 116. The current method for correlating asynchronous alarms may then correlate the symptom alarms (a ping failure alarm) with the root cause alarm (CER failure alarm), if they have matching IP addresses and are received within the CLS window.

The above embodiment illustrates one exemplary method of implementing the present invention and it is not intended to limit the present invention to this particular implementation. Furthermore, FIG. 1 and FIG. 2 include only the network elements used to describe the present invention. It is not intended to show all network elements necessary to deliver a VoIP or similar service.

Figures 3, 3A:
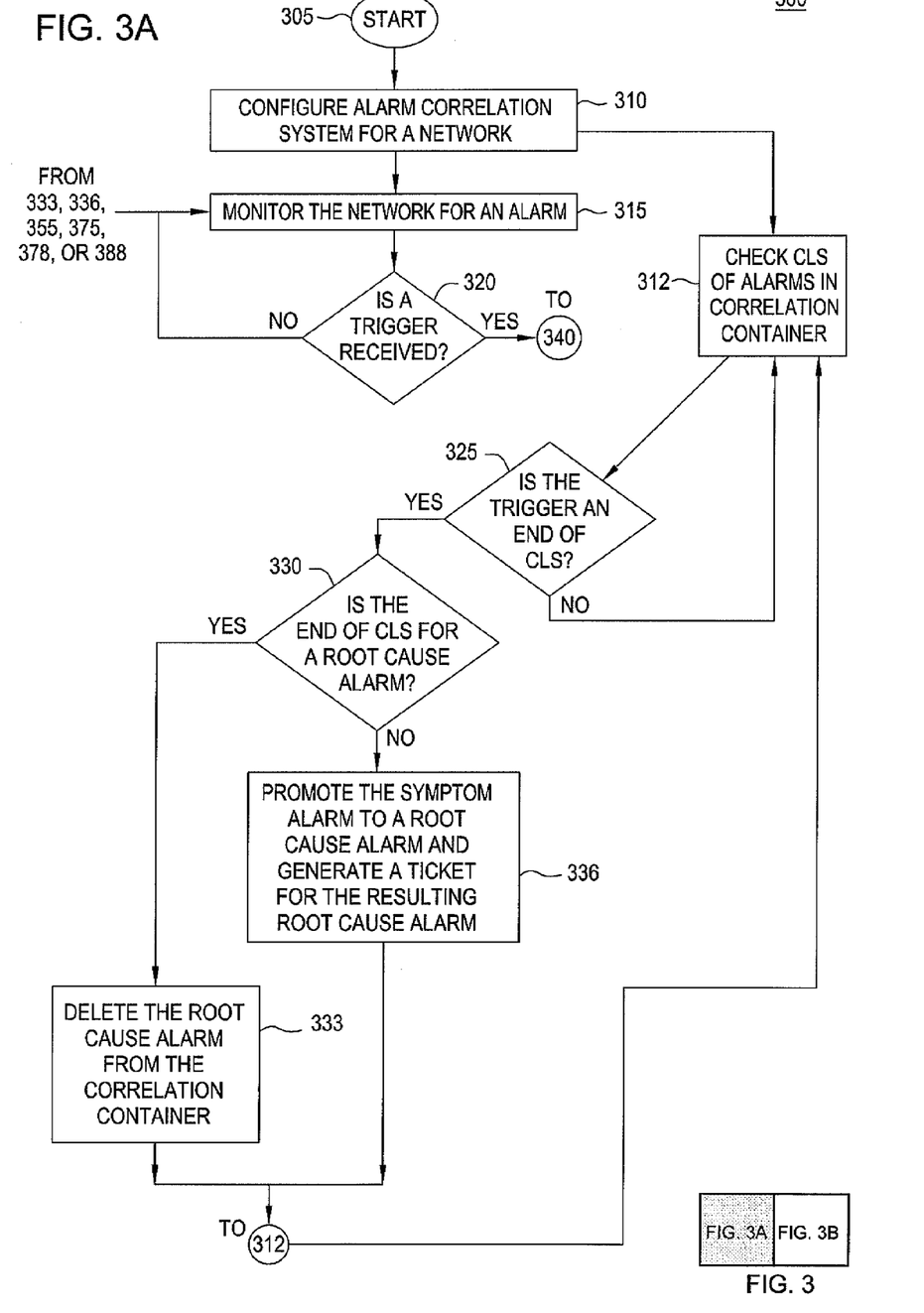
FIG. 3 illustrates a flowchart of the method for providing asynchronous alarm correlation.
Figures 3, 3B:
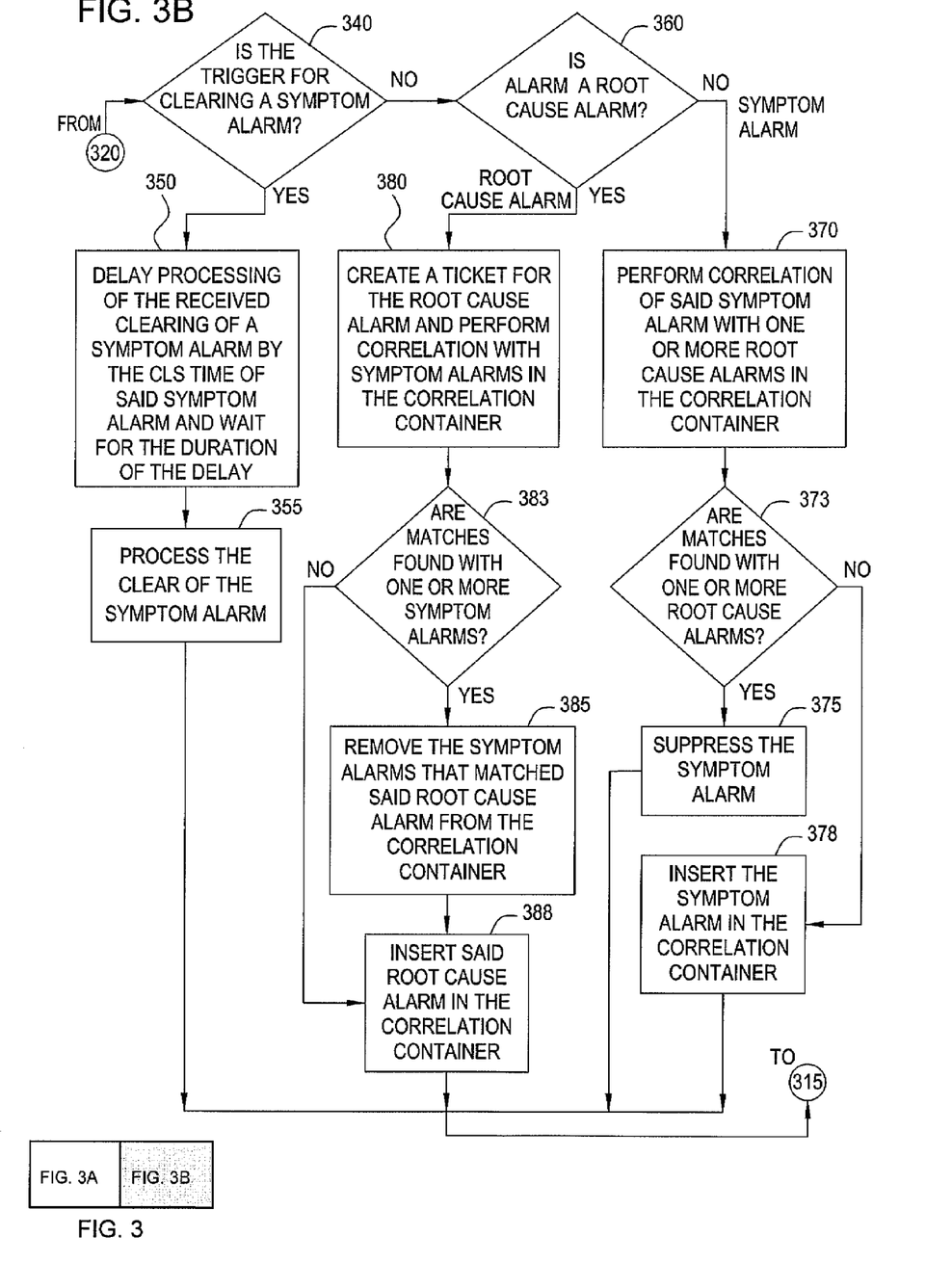

FIG. 3 illustrates the flowchart of the method 300 for providing asynchronous alarm correlation. For example, method 300 can be implemented in the application servers or systems 131, 132 of FIG. 1. Method 300 starts in step 305 and proceeds to step 310.

In step 310, method 300 configures asynchronous alarm correlation system, e.g., for a network or a service. For example, the service provider may instantiate a correlation container, a list of root cause alarms, a list of symptom alarms, a list of rules for correlating the root cause alarms with the symptom alarms, one or more attributes for each of the root cause alarms and symptom alarms for the customer. For example, an attribute for an alarm may be a Correlation Life Span (CLS). Method 300 may proceed to step 315 or step 312.

In step 315, method 300 monitors the network for an alarm or event, e.g., reception of an alarm, or a clearing of an alarm. For example, the method may monitor the network for receiving an alarm or event that may be used to perform an action on an alarm object. For example, an alarm due to CER failure may be a trigger for performing alarm correlation.

In step 320, method 300 determines whether or not an alarm or event is received. The trigger may be a reception of an alarm, or a clearing of an alarm. If no trigger is received, then the method returns to step 315 to continue monitoring. If an alarm or event is received, then the method proceeds to step 340.

In step 312, method 300 checks the CLS of each alarm object, either root cause alarm or symptom alarm, in the correlation container.

In step 325, method 300 determines whether or not an end of CLS of an alarm object is reached. If the trigger is an end of CLS, then the method proceeds to step 330. Otherwise, the method proceeds to step 312.

In step 330, method 300 determines whether or not the end of CLS is for a root cause alarm. If the end of CLS is for a root cause alarm, then method 300 proceeds to step 333. Otherwise, the method proceeds to step 336.

In step 333, method 300 deletes the root cause alarm from the correlation container. The method then proceeds to step 312 to continue checking the CLS of the next alarm object in the correlation container.

In step 336, method 300 promotes (e.g., remarked or relabeled) the symptom alarm to a root cause alarm and generates a ticket for the resulting root cause alarm. The method then proceeds to step 312 to continue checking the CLS of the next alarm object in the correlation container.

In step 340, method 300 determines whether or not the received trigger is for clearing of a symptom alarm. If the trigger is for clearing of a symptom alarm, then the method proceeds to step 350. Otherwise, the method proceeds to step 360.

In step 350, method 300 delays processing (e.g., waits for a period of time) of the received clearing of the symptom alarm by the CLS time of the symptom alarm and waits for the duration of the delay. The method then proceeds to step 355.

In step 355, method 300 processes the clearing of the symptom alarm. The method then proceeds to step 315 to continue monitoring the network.

In step 360, method 300 determines whether or not the alarm is a root cause alarm. If the alarm is a root cause alarm, then the method proceeds to step 380. Otherwise, the method proceeds to step 370.

In step 370, method 300 performs correlation of the symptom alarm with one or more root cause alarms in the correlation container. For example, the method seeks correlation with root cause alarms in the correlation container within the correlation life span, for example, with the same IP address. The method then proceeds to step 373.

In step 373, method 300 determines whether or not matches were found with one or more root cause alarms in the correlation container. If there is no match with at least one root cause alarm, then the method proceeds to step 378. If there is a match, the method proceeds to step 375.

In step 375, method 300 suppresses the symptom alarm. For example, the method will not insert the symptom alarm into the correlation container. The method then proceeds to step 315 to continue monitoring the network.

In step 378, method 300 inserts the symptom alarm into the correlation container. The method then proceeds to step 315 to continue monitoring.

In step 380, method 300 creates a ticket for the root cause alarm and performs correlation of the root cause alarm with symptom alarms in the correlation container. The method then proceeds to step 383.

In step 383, method 300 determines whether or not matches were found with one or more symptom alarms in the correlation container. If no matches were found, then the method proceeds to step 388. Otherwise, the method proceeds to step 385.

In step 385, method 300 removes the symptom alarms that matched the root cause alarm (as determined in step 383) from the correlation container. The method then proceeds to step 388.

In step 388, method 300 inserts the root cause alarm into the correlation container. The method then proceeds to step 315 to continue monitoring the network.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
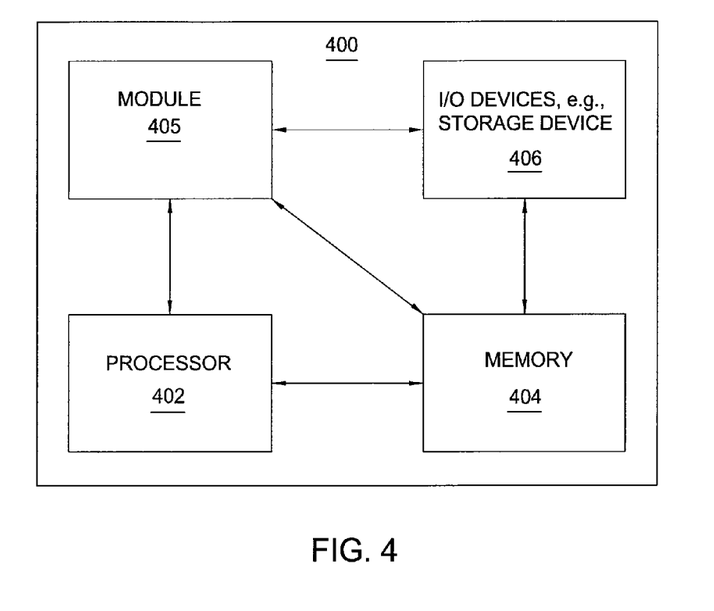
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing asynchronous alarm correlation, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module for providing asynchronous alarm correlation or process 405 can be loaded into memory 404 and executed by processor 402 to implement the functions as discussed above. As such, the present method 405 for providing asynchronous alarm correlation (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an alarm correlation in a communication network, comprising:
  receiving a trigger; and
  performing an asynchronous correlation of a new root cause alarm with a symptom alarm, wherein the trigger comprises a reception of the new root cause alarm, wherein the performing the asynchronous correlation comprises:
    creating a ticket for the new root cause alarm;
    removing any symptom alarms that were previously stored in a correlation container that matches the new root cause alarm; and
    inserting the new root cause alarm in the correlation container.

2. A method for providing an alarm correlation in a communication network, comprising:
  receiving a trigger; and
  performing an asynchronous correlation of a root cause alarm with a new symptom alarm, wherein the trigger comprises a reception of the new symptom alarm, wherein the performing the asynchronous correlation comprises:
    suppressing the new symptom alarm if the new symptom alarm matches any root cause alarms stored in a correlation container; and
    inserting the new symptom alarm into the correlation container if the new symptom alarm fails to match any root cause alarms stored in the correlation container.

3. A method for providing an alarm correlation in a communication network, comprising:
  receiving a trigger; and
  performing an asynchronous correlation of a stored root cause alarm with a symptom alarm, wherein the trigger comprises an end of a correlation life span time period for the stored root cause alarm in a correlation container, wherein the performing the asynchronous correlation comprises:
    removing the stored root cause alarm from the correlation container.

4. A method for providing alarm correlation in a communication network, comprising:
  receiving a trigger; and
  performing an asynchronous correlation of a root cause alarm with a stored symptom alarm, wherein the trigger comprises an end of a correlation life span time period for the stored symptom alarm in a correlation container, wherein the performing the asynchronous correlation comprises:
    promoting the stored symptom alarm to the root cause alarm in the correlation container; and
    generating a ticket for the stored symptom alarm that has been promoted to the root cause alarm.

5. A non-transitory computer-readable medium having stored thereon a plurality of instructions, the plurality of instructions including instructions which, when executed by a processor, cause the processor to perform a method for providing an alarm correlation in a communication network, comprising:
  receiving a trigger; and
  performing an asynchronous correlation of a new root cause alarm with a symptom alarm, wherein the trigger comprises a reception of the new root cause alarm, wherein the performing the asynchronous correlation comprises:
    creating a ticket for the new root cause alarm;
    removing any symptom alarms that were previously stored in a correlation container that matches the new root cause alarm; and
    inserting the new root cause alarm in the correlation container.

6. A non-transitory computer-readable medium having stored thereon a plurality of instructions, the plurality of instructions including instructions which, when executed by a processor, cause the processor to perform a method for providing an alarm correlation in a communication network, comprising:
  receiving a trigger; and
  performing an asynchronous correlation of a root cause alarm with a new symptom alarm, wherein the trigger comprises a reception of the new symptom alarm, wherein the performing the asynchronous correlation comprises:

suppressing the new symptom alarm if the new symptom alarm matches any root cause alarms stored in a correlation container; and inserting the new symptom alarm into the correlation container if the new symptom alarm fails to match any root cause alarms stored in the correlation container.

7. A non-transitory computer-readable medium having stored thereon a plurality of instructions, the plurality of instructions including instructions which, when executed by a processor, cause the processor to perform a method for providing an alarm correlation in a communication network, comprising:

receiving a trigger; and performing an asynchronous correlation of a stored root cause alarm with a symptom alarm, wherein the trigger comprises an end of a correlation life span time period for the stored root cause alarm in a correlation container, wherein the performing the asynchronous correlation comprises:

removing the stored root cause alarm from the correlation container.

8. A non-transitory computer-readable medium having stored thereon a plurality of instructions, the plurality of instructions including instructions which, when executed by a processor, cause the processor to perform a method for providing an alarm correlation in a communication network, comprising:

receiving a trigger; and performing an asynchronous correlation of a root cause alarm with a stored symptom alarm, wherein the trigger comprises an end of a correlation life span time period for the stored symptom alarm in a correlation container, wherein the performing the asynchronous correlation comprises:

promoting the stored symptom alarm to a root cause alarm in the correlation container; and generating a ticket for the stored symptom alarm that has been promoted to the root cause alarm.

9. An apparatus for providing an alarm correlation in a communication network, comprising:

a processor configured to:

receive a trigger; and perform an asynchronous correlation of a new root cause alarm with a symptom alarm, wherein the trigger comprises a reception of the new root cause alarm, wherein the processor is configured to create a ticket for the new root cause alarm, to remove any symptom alarms that were previously stored in a correlation container that matches the new root cause alarm, and to insert the new root cause alarm in the correlation container.

10. An apparatus for providing an alarm correlation in a communication network, comprising:

a processor configured to:

receive a trigger; and perform an asynchronous correlation of a root cause alarm with a new symptom alarm, wherein the trigger comprises a reception of the new symptom alarm, wherein the processor is configured to suppress the new symptom alarm if the new symptom alarm matches any root cause alarms stored in a correlation container, and to insert the new symptom alarm into the correlation container if the new symptom alarm fails to match any root cause alarms stored in the correlation container.

* * * * *